United States Patent Office 2,727,034
Patented Dec. 13, 1955

2,727,034

PRIMARY AROMATIC AMINO ETHER OF CELLULOSE AND PREPARATION OF SAME

Roland R. McLaughlin, Toronto, Ontario, and Donald B. Mutton, New Toronto, Ontario, Canada No Drawing. Application May 31, 1952,
Serial No. 291,068

5 Claims. (Cl. 260—211)

This invention relates to a new primary aromatic amino ether of cellulose and to processes of preparing the same.

During the past twenty-five years or so, a great deal of work has been directed to the attempted preparation of cellulose ethers and esters containing aromatic nitro or amino groups. The purpose of this work was to obtain cellulose derivatives which could be diazotized and coupled to form azo dyes. The result in mind was to obtain a coloured cellulose having the dye present as an integral part of the molecule instead of merely being adsorbed on the surface of the cellulose fibres.

In general, the method of procedure has been to condense alkali cellulose (i. e. the swollen complex of cellulose and aqueous sodium hydroxide formed by steeping the cellulose in a caustic solution of 12 to 50% sodium hydroxide and pressing out the excess liquid, this material being a conventional intermediate in the production of viscose rayon and sodium carboxymethyl cellulose) with the halide of a compound containing the desired nitro or amino group. In thef ormer case, the nitro group would then be reduced to an amino group which would in turn be diazotized and coupled with various reagents to produce a coloured cellulose.

While such experiments have met with some degree of success, they have not provided results capable of practical application because of the low degree of substitution (referred to in the art as D. S.) of the hydroxyl groups in the cellulose molecule by the halide compound. In general, it has been found impossible in condensing halides of the above character with alkali cellulose to produce a D. S. in excess of approximately 0.015 although in one or two cases a D. S. of approximately 0.04 has been obtained. With such a low D. S., the colour produced upon diazotizing the free amino group and coupling with a suitable coupling component is superficial only and consequently affords no practical advantage over conventional processes.

The present invention is based upon the surprising discovery that alkali cellulose can be condensed with p-amino-ω-chloroacetophenone to produce a substituted cellulose having a D. S. of up to 0.40 in a single reaction step. This derivative is the ω-(p-amino acetophenone) ether of cellulose, and for purposes of reference is hereinafter referred to by the trivial name of ω-cellulose. It may be represented by the following general formula:

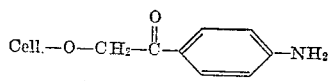

ω-Cellulose possesses many outstanding characteristics. It may, for instance, be easily converted to a coloured cellulose derivative by diazotizing the free amino group in the usual way and coupling with any desired compound suitable for that purpose. For example, by adding the corresponding cellulose diazonium compound to an alkaline solution of β-naphthol coupling takes place to produce a red fibre. This coloured derivative may be further treated, for example, by steeping in alkali and treatment with sodium chloroacetate to form the sodium carboxymethyl ether of the coloured cellulose derivative, the result being a coloured water-soluble cellulose ether.

Alternatively, the coloured ω-cellulose may be xanthated in the usual way by treatment with sodium hydroxide and carbon disulphide and regenerated in the form of threads or films to produce coloured rayon or cellophane. In other words, the ω-cellulose of the invention and its coloured derivatives may be passed through any of the normal reactions of the cellulose industries without destroying the either linkage by which the p-aminoacetophenone moieties are attached to the cellulose molecule.

More surprising, however, is the apparent modification in adsorptive characteristics of the cellulose fibre brought about by the introduction of the p-aminoacetophenone group, which apparently imparts to the cellulose fibre a greatly increased capacity for adsorbing certain substances. We have found, for instance, that the ω-cellulose will be coloured by azo, triphenyl methane, and other classes of dyes if merely steeped in a bath of the dyestuff in the manner currently used to dye wool fibres. In other words, the present invention affords a method of rendering cellulose fibres, for instance cotton, susceptible to dyeing with azo dyes to produce fast dyeings heretofore impossible of accomplishment.

According to the present invention, we prepare ω-cellulose by reacting alkali-cellulose and p-amino-ω-chloroacetophenone in an alcohol solution at a somewhat elevated temperature. The reaction takes place in accordance with the following equation:

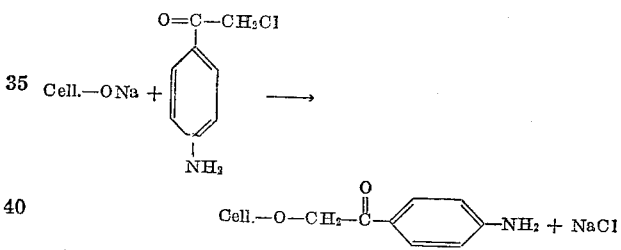

In carrying out this reaction, the alkali cellulose is prepared in the usual manner by steeping cellulose in caustic alkali and squeezing out the excess fluid. In general, the alkali will be sodium hydroxide, but caustic potash or any of the other alkalies which have been used to produce alkali cellulose may be used. Any suitable cellulose may be used depending upon what ultimate use is to be made of the product. The alkali cellulose is shredded for several hours, and then washed with several portions of alcohol (methyl or ethyl) to reduce the amount of alkali and water which is present. In carrying out this washing, it is not necessarily intended to remove all of the alkali nor all of the water, but only sufficient to favour the reaction of p-amino-ω-chloroacetophenone with alkali cellulose over the hydrolysis of the p-amino-ω-chloroacetophenone by the remaining alkali solution. Accordingly, it is not necessary to use absolute alcohol for washing and less expensive commercial 95% alcohol may be used for this purpose.

The washed alkali-cellulose is then treated with p-amino-ω-chloroacetophenone by placing them together in a reaction vessel in the presence of sufficient substantially water-free alcohol (either methyl or ethyl) to dissolve the p-amino-ω-chloroacetophenone and completely cover the alkali cellulose, and the mixture is refluxed until the reaction is complete at the reflux temperature of the solvent, the reaction usually being complete after a period of approximately eight hours. We generally prefer to use equivalent portions of alkali-cellulose and p-amino-ω-chloroacetophenone, the amount of the latter substance being based upon the sodium (or other alkali)

contained in the alkali cellulose. Thus, for every mol of anhydrous glucose in the original cellulose used to prepare the alkali-cellulose, we would use approximately 1.4 mols of p-amino-ω-chloroacetophenone.

Following completion of the reaction, the cellulose derivative is removed from the reaction vessel and thoroughly extracted several times, preferably with alternate portions of hot acetone and water. The purified cellulose ether is fibrous and may be air-dried.

Although p-amino-ω-chloroacetophenone is not at the moment available commercially, it may be prepared quite simply from acetanilide and chloroacetyl chloride as taught by Kunckell (Berichte vol. 33, page 2644, 1900).

The following examples illustrate the preparation of ω-cellulose and its use in the production of various coloured products.

*Example 1.—Preparation of ω-cellulose*

Twenty-three gm. of air-dried cellulose, previously shredded from sulphite pulp, were steeped for 2 hours in 18% by weight sodium hydroxide solution. Most of the excess liquid was then drained off through a wire screen, and the alkali cellulose was rigorously pressed using a hand-operated screw-press. The pressed alkali cellulose was broken up and placed in a 2000 ml. beaker with sufficient 95% ethyl alcohol to cover it. It was allowed to stand for five minutes with occasional stirring and was then filtered with suction. This washing operation was performed three time in all.

After the last filtration, the alkali cellulose was transferred to a 2000 ml. flask containing a solution of 35 gm. p-amino-ω-chloroacetophenone in 1000 ml. of 95% ethyl alcohol. The flask was fitted with a reflux condenser, and the mixture was heated on the steam bath under reflux for a period of eight hours.

The cellulose derivative was filtered from the reaction liquor and washed three times with hot acetone. This was followed by three washings with warm water. The operation of alternate acetone and water washings was performed six times in all. After a final acetone rinse, the ω-cellulose was allowed to dry in the air. It was light yellow and fibrous.

Analysis of a sample of the air-dried product by the Kjeldahl method indicated a nitrogen content of 2.24% which corresponds to a degree of substitution of 0.33.

Samples of numerous materials prepared in accordance with the above procedure and analysed for nitrogen by the Kjeldahl method indicated a degree of substitution running in most cases between 0.2 to 0.3. In some cases, however, a D. S. about as high as 0.4 was obtained.

*Example 2.—Comparative dyeing of ω-cellulose and ordinary cellulose*

A 0.5 gm. sample of ω-cellulose prepared as in Example 1 was immersed in 50 ml. of an aqueous solution of Malachite Green containing about 0.1 gm. of the dye together with an 0.5 gm. sample of untreated sulphite pulp cellulose of the type used to prepare the alkali cellulose in Example 1. After ten minutes, both samples were removed and washed thoroughly with water and alcohol until no more colour was removed in the washings in each case. The ω-cellulose was a brilliant deep green colour which was very attractive. Washing with water, however, completely removed the colour from the sample of untreated sulphite pulp cellulose.

*Example 3.—Preparation of coloured fibre from ω-cellulose by diazotization and coupling*

Five gm. ω-cellulose prepared as in Example 1 were soaked in 100 ml. distilled water and the mixture was cooled to 0–5° C. in an ice-salt bath. To the cold mixture was added slowly, with stirring, 10 ml. of 1:1 hydrochloric acid. After half an hour, a solution of 1 gm. sodium nitrite in 10 ml. water was added, with stirring, to the cold mixture. The reaction was allowed to proceed for fifteen minutes at 0–5° C. with occasional stirring. The diazotized ω-cellulose was then quickly filtered from the solution by suction and washed immediately with 100 ml. ice water. Care was taken not to draw air through the mass.

The wet, diazotized ω-cellulose was then added to a previously prepared coupling bath consisting of 2.5 gm. β-naphthol dissolved in 100 ml. of 1% aqueous sodium hydroxide solution. The cellulose derivative was left in the coupling bath for half an hour with occasional stirring. It was then removed and thoroughly washed with water and then with alcohol until no more colour was removed in the washings. For complete washing, more than 1000 ml. of 95% ethyl alcohol were used. The air-dried coloured cellulose derivatives was dark red.

A sample was analyzed by the Kjeldahl method and was found to contain 2.27% nitrogen. This indicated that almost two-thirds of the amino groups of the ω-cellulose had been coupled in the above reaction.

*Example 4.—Preparation of coloured carboxymethyl cellulose*

A 2.8 gm. portion of the coloured cellulose derivative prepared as in Example 3 was soaked in 18% by weight sodium hydroxide solution for two hours. It was then drained, pressed and crumbled and placed in a mortar. To the coloured alkali cellulose was added 3.3 gm. powdered sodium chloroacetate. The mixture was kneaded occasionally for two days, being let stand overnight. A few drops of water were added each day to replace moisture lost by evaporation.

To the mixture was then added, with kneading, 1.7 ml. water and 0.65 gm. flake sodium hydroxide. After kneading for fifteen minutes, 1.9 gm. sodium chloroacetate were added. Kneading was continued, as before, for two days.

The above procedure was repeated once more. This time the product appeared to be almost completely soluble in water. It was dissolved in 50 ml. of water to give a very viscous, dark red solution. This solution was purified by continuous dialysis with distilled water. The dialysis membrane was cellophane, and the time required for purification was 40 hours.

The purified solution of coloured sodium carboxymethyl cellulose was analyzed by the method of Herbst. (Can. Journ. Research, B, 28: 737 (1950).) The results indicate a D. S. with respect to the sodium carboxymethyl group of approximately 1.5

*Example 5.—Preparation of coloured regenerated cellulose*

One gm. of coloured cellulose derivative, prepared as in Example 3, was steeped in 18% by weight sodium hydroxide solution overnight. After draining, pressing and crumbling, the coloured alkali cellulose was placed in a 500 ml. two-necked flask fitted with a dropping funnel and an outlet to suction. After evacuation of the flask with a water pump, about 0.5 gm. carbon disulphide was added through the dropping funnel. Since the flask was not completely air-tight, it was evacuated hourly and a few drops of carbon disulphide added. At the end of three hours, the excess carbon disulphide was evacuated by means of the pump.

The xanthated material was then added to 20 ml. of 8% sodium hydroxide solution. The mixture was stirred and then filtered on a coarse sintered glass funnel to remove undissolved material. The filtrate was bright red but not very viscous.

The coloured viscose was regenerated in a 5% sulphuric acid bath using a hypodermic needle. Short, bright red fibres were formed. Unfortunately, the hypodermic needle was too coarse and the viscose solution not viscous enough to be able to produce long fibres. After washing and drying, the fibres appeared very dark in colour and were brittle.

Some of the red fibres of regenerated cellulose derivatives were examined under a low power microscope. The colour appeared to be uniformly distributed.

What we claim as our invention is:

1. A method of preparing the ω-(p-amino-acetophenone) ether of cellulose comprising heating alkali cellulose with a substantially water free alcoholic solution of p-amino-ω-chloroacetophenone.

2. A method for preparing the ω-(p-amino-acetophenone) ether of cellulose comprising; preparing alkali-cellulose by reacting cellulose with an alkali hydroxide; thoroughly shredding the alkali-cellulose; washing the shredded alkali cellulose with alcohol to reduce the amount of alkali and water present; and treating the washed alkali-cellulose with a substantially water-free alcoholic solution of p-amino-ω-chloroacetophenone at the reflux temperature of the solvent until the reaction is complete.

3. A method for preparing the ω-(p-amino-acetophenone) ether of cellulose comprising; preparing alkali-cellulose by reacting cellulose with an alkali hydroxide; thoroughly shredding the alkali-cellulose; washing the shredded alkali cellulose with alcohol to reduce the amount of alkali and water present; treating the washed alkali-cellulose with a substantially water-free solution of p-amino-ω-chloroacetophenone at the reflux temperature of the solvent until the reaction is complete; thoroughly extracting the cellulose ether thus produced with alternate portions of hot acetone and water and drying the product thus produced.

4. The ω-(p-amino-acetophenone) ether of cellulose.

5. A cellulose ether having the following formula:

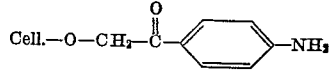

References Cited in the file of this patent

UNITED STATES PATENTS 1,947,464     Dreyfus _____ Feb. 20, 1934

FOREIGN PATENTS 398,279     Great Britain _____ Sept. 14, 1933